United States Patent
Wang et al.

(10) Patent No.: US 7,839,828 B2
(45) Date of Patent: Nov. 23, 2010

(54) METHOD AND APPARATUS FOR SELECTING A TRANSPORT FORMAT COMBINATION

(75) Inventors: Jin Wang, Central Islip, NY (US); Stephen E. Terry, Northport, NY (US); Arty Chandra, Manhasset Hills, NY (US); Guodong Zhang, Farmingdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 899 days.

(21) Appl. No.: 11/609,544

(22) Filed: Dec. 12, 2006

(65) Prior Publication Data

US 2007/0140261 A1  Jun. 21, 2007

Related U.S. Application Data

(60) Provisional application No. 60/750,602, filed on Dec. 15, 2005, provisional application No. 60/827,811, filed on Oct. 2, 2006.

(51) Int. Cl.
*H04W 4/00* (2009.01)
*H04W 72/00* (2009.01)
*H04B 7/208* (2006.01)
*H04B 7/00* (2006.01)

(52) U.S. Cl. .............. 370/335; 370/329; 370/344; 455/450; 455/464; 455/509

(58) Field of Classification Search .......... 370/335, 370/329, 344; 455/450, 464, 509
See application file for complete search history.

(56) References Cited

U.S. PATENT DOCUMENTS 5,878,036 A  3/1999  Spartz et al.

(Continued)

FOREIGN PATENT DOCUMENTS

WO  03/041317  5/2003

(Continued)

OTHER PUBLICATIONS

3rd Generation Partnership Project; Technical Specification Group Radio Access Network; FDD Enhanced Uplink; Overall description; Stage 2 (Release 6); 3GPP TS 25.309 V6.4.0 (Sep. 2005).

(Continued)

*Primary Examiner*—Kamran Afshar
*Assistant Examiner*—Munsoon Choo
(74) *Attorney, Agent, or Firm*—Woodcock Washburn LLP

(57) ABSTRACT

A method and apparatus for selecting a transport format combination (TFC) are disclosed. A TFC recovery and elimination unit generates an allowed transport format combination set (TFCS) subset by recovering supported TFCs and eliminating not supported TFCs based on allocated radio resources and parameters that are new. A multiplexing and transmission sequence number (TSN) setting unit generates a medium access control (MAC) protocol data unit (PDU) by multiplexing at least one higher layer PDU within a maximum supported MAC PDU size. A TFC selection and padding unit selects a TFC for the MAC PDU from the allowed TFCS subset and performs padding of the MAC PDU, if necessary, so that the MAC PDU fits into the selected TFC. For retransmission, a new allowed TFCS subset may be generated based on new radio resources and parameters and the MAC PDU may be fragmented.

36 Claims, 3 Drawing Sheets

U.S. PATENT DOCUMENTS

| | | | |
|---|---|---|---|
| 6,510,172 B1 | 1/2003 | Miller | |
| 7,701,922 B2* | 4/2010 | Terry | 370/349 |
| 2003/0081692 A1* | 5/2003 | Kwan et al. | 375/295 |
| 2004/0213293 A1* | 10/2004 | Basso et al. | 370/480 |
| 2004/0264507 A1 | 12/2004 | Cho et al. | |
| 2005/0083897 A1* | 4/2005 | Terry et al. | 370/338 |
| 2006/0067279 A1* | 3/2006 | Kim et al. | 370/335 |
| 2009/0168683 A1* | 7/2009 | Franceschini et al. | 370/312 |

FOREIGN PATENT DOCUMENTS

| | | |
|---|---|---|
| WO | 03/043221 | 5/2003 |
| WO | WO 03/043221 A1 * | 5/2003 |
| WO | 02/059869 | 7/2004 |
| WO | 2004/059869 | 7/2004 |

OTHER PUBLICATIONS

3$^{rd}$ Generation Partnership Project; Technical Specification Group Radio Access Network; FDD Enhanced Uplink; Overall description; Stage 2 (Release 6); 3GPP TS 25.309 V6.6.0 (Mar. 2006).

3$^{rd}$ Generation Partnership Project; Technical Specification Group Radio Access Network; Medium Access Control (MAC) protocol specification (Release 6); 3GPP TS 25.321 V6.6.0 (Sep. 2005).

3$^{rd}$ Generation Partnership Project; Technical Specification Group Radio Access Network; Medium Access Control (MAC) protocol specification (Release 7); 3GPP TS 25.321 V7.2.0 (Sep. 2006).

3$^{rd}$ Generation Partnership Project; Technical Specification Group Radio Access Network; Requirements for Evolved UTRA (E-UTRA) and Evolved UTRAN (E-UTRAN) (Release 7); 3GPP TR 25.913 V7.1.0 (Sep. 2005).

3$^{rd}$ Generation Partnership Project; Technical Specification Group Radio Access Network; Requirements for Evolved UTRA (E-UTRA) and Evolved UTRAN (E-UTRAN) (Release 7); 3GPP TR 25.913 V7.3.0 (Mar. 2006).

3$^{rd}$ Generation Partnership Project; Technical Specification Group Radio Access Network; FDD Enhanced Uplink; Overall description; Stage 2 (Release 6); 3GPP TS 25.309 V6.4.0 (Sep. 2005).

3$^{rd}$ Generation Partnership Project; Technical Specification Group Radio Access Network; FDD Enhanced Uplink; Overall description; Stage 2 (Release 6); 3GPP TS 25.309 V6.6.0 (Mar. 2006).

3$^{rd}$ Generation Partnership Project; Technical Specification Group Radio Access Network; Medium Access Control (MAC) protocol specification (Release 6); 3GPP TS 25.321 V6.6.0 (Sep. 2005).

3$^{rd}$ Generation Partnership Project; Technical Specification Group Radio Access Network; Medium Access Control (MAC) protocol specification (Release 7); 3GPP TS 25.321 V7.2.0 (Sep. 2006).

3$^{rd}$ Generation Partnership Project; Technical Specification Group Radio Access Network; Requirements for Evolved UTRA (E-UTRA) and Evolved UTRAN (E-UTRAN) (Release 7); 3GPP TR 25.913 V7.1.0 (Sep. 2005).

3$^{rd}$ Generation Partnership Project; Technical Specification Group Radio Access Network; Requirements for Evolved UTRA (E-UTRA) and Evolved UTRAN (E-UTRAN) (Release 7); 3GPP TR 25.913 V7.3.0 (Mar. 2006).

* cited by examiner

METHOD AND APPARATUS FOR SELECTING A TRANSPORT FORMAT COMBINATION

CROSS REFERENCE TO RELATED APPLICATION

This application claims the benefit of U.S. Provisional Application No. 60/750,602 filed Dec. 15, 2005, and U.S. Provisional Application No. 60/827,811 filed Oct. 2, 2006, which are incorporated by reference as if fully set forth.

FIELD OF INVENTION

The present invention is related to wireless communication systems. More particularly, the present invention is related to a method and apparatus for selecting a transport format combination (TFC). The present invention is applicable to any wireless system, including high speed packet access+ (HSPA+) in third generation (3G) wireless communication systems and long term evolution (LTE) of the 3G wireless communication systems.

BACKGROUND

Developers of 3G wireless communication systems are considering LTE of the 3G systems to develop a new radio access network for providing a high-data-rate, low-latency, packet-optimized, improved system with higher capacity and better coverage. In order to achieve these goals, instead of using code division multiple access (CDMA) which is currently used in 3G systems, orthogonal frequency division multiple access (OFDMA) and frequency division multiple access (FDMA) are proposed as air interfaces of LTE of 3G to be used in downlink and uplink transmissions, respectively. In parallel, also being considered is an evolved packet-optimized system, so called HSPA+, which is a conventional CDMA-based system.

The basic uplink transmission scheme in LTE is based on a low peak-to-average power ratio (PAPR) single-carrier FDMA transmission with a cyclic prefix to achieve uplink inter-user orthogonality and to enable efficient frequency-domain equalization at the receiver side. Both localized and distributed transmission may be used to support both frequency-adaptive and frequency-diversity transmission. The uplink transmission scheme in HSPA+ is based on CDMA.

FIG. 1 shows a basic sub-frame structure for uplink transmission proposed in LTE. The sub-frame includes six long blocks (LBs) and two short blocks (SBs). Alternatively, three SBs may be used per sub-frame. FIG. 2 shows the allocation of subcarrier blocks in the frequency domain. Seven (7) orthogonal frequency division multiplexing (OFDM) symbols are transmitted during a 0.5 msec subframe over allocated subcarriers, (e.g., ten (10) subcarriers). In-band pilot symbols and data symbols are multiplexed in the subcarriers as shown in FIG. 2.

Due to the change of the physical layer structure, new attributes and resource allocation scheme for uplink transmission, TFC selection procedures defined in the current wireless communication standards cannot deal with the new system requirement and thus part of it should be re-designed. In LTE, the number of subcarrier blocks and the number of TTIs are new radio resources to be considered for TFC selection, and the radio resource and parameters reallocated for the retransmission of the same data block may be different from what are used for the initial transmission. In HSPA+ and LTE, even when the radio resources and parameters allocated for the retransmission of the same data block remain the same as what are used for the initial transmission, using the same TFC selection, (especially the same modulation and coding scheme (MCS)), may not be efficient to overcome the fading channel and to reduce the number of retransmissions.

Therefore, it would be desirable to provide a new TFC selection procedure for one set of data blocks among a plurality of sets of data blocks to take into account these new features and to change the MCS for the subsequent retransmissions to adapt to the channel conditions.

SUMMARY

The present invention is related to a method and apparatus for selecting a TFC for one set of data blocks among a plurality of sets of data blocks. A TFC recovery and elimination unit generates an allowed transport format combination set (TFCS) subset by recovering supported TFCs and eliminating not supported TFCs based on allocated radio resources and parameters. An attribute of a transport format includes an MCS and the number and distribution of subcarrier blocks. A multiplexing and transmission sequence number (TSN) setting unit generates an LTE MAC protocol data unit (PDU) by multiplexing at least one higher layer PDU within a maximum supported LTE MAC PDU size. A TFC selection and padding unit selects a TFC for the LTE MAC PDU from the allowed TFCS subset and performs padding of the LTE MAC PDU, if necessary, so that the LTE MAC PDU fits into the selected TFC. For retransmission, a new allowed TFCS subset may be generated based on new radio resources and parameters and the LTE MAC PDU may be fragmented.

DETAILED DESCRIPTION OF THE PREFERRED EMBODIMENTS

When referred to hereafter, the terminology "WTRU" includes but is not limited to a user equipment (UE), a mobile station (STA), a fixed or mobile subscriber unit, a pager, or any other type of device capable of operating in a wireless environment. When referred to hereafter, the terminology "Node-B" includes but is not limited to a base station, an evolved Node-B (e-Node-B), a site controller, an access point (AP) or any other type of interfacing device in a wireless environment.

The features of the present invention may be incorporated into an integrated circuit (IC) or be configured in a circuit comprising a multitude of interconnecting components.

Figure 1:
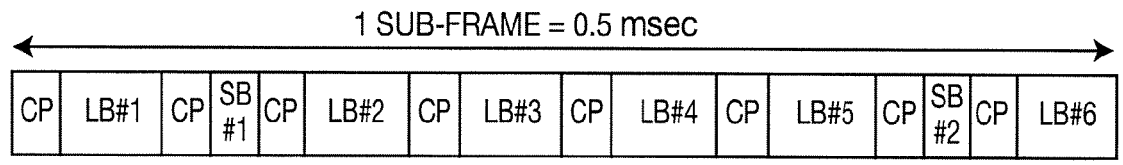
FIG. 1 shows a proposed basic sub-frame structure for the uplink transmission in LTE.
Figure 2:
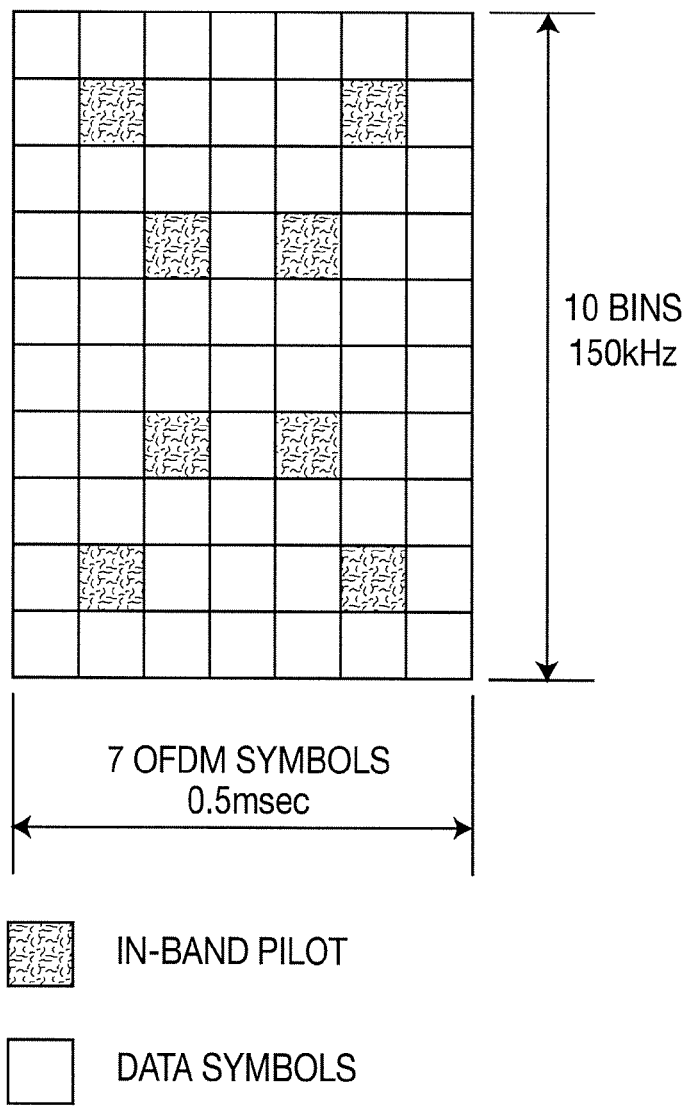
FIG. 2 shows allocation of subcarrier blocks in the frequency domain in LTE.
Figure 3:
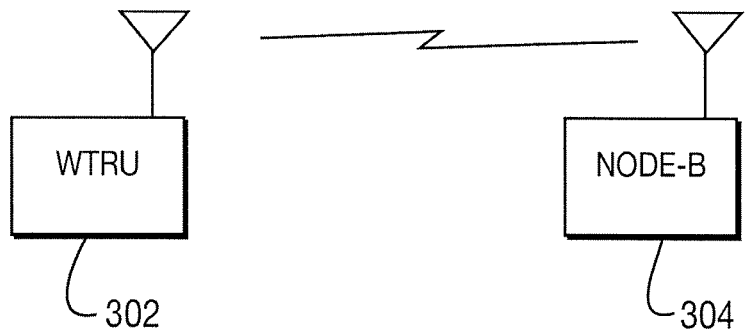
FIG. 3 is a wireless communication system configured in accordance with the present invention.

FIG. 3 is a wireless communication system 300 configured in accordance with the present invention. The system 300 includes a WTRU 302 and a Node-B 304. The Node-B 304 dynamically allocates radio resources and parameters to the WTRU 302 for both downlink and uplink transmissions. The allocated radio resources and parameters include, but are not limited to, a maximum allowed transmit power, a recommended MCS, the number and distribution of subcarrier blocks, the number of TTIs, or the like. The WTRU 302 then selects a TFC based on the allocated resources and parameters for uplink transmission.

A transport format (TF) includes a dynamic part and a semi-static part. In accordance with the present invention, the dynamic part of the TF includes additional attributes including a modulation rate, a coding rate, and the number and distribution of subcarrier blocks (for LTE only). The dynamic part and the semi-static part of the TF are as follows:

---

Dynamic part: {transport block size, transport block set size, sub-TTI size, fragmentation ID, modulation rate, coding rate, distribution & number of subcarrier blocks (LTE only)}
Semi-static part: {type of channel coding, size of cyclic redundancy check (CRC)}

---

Figure 4:
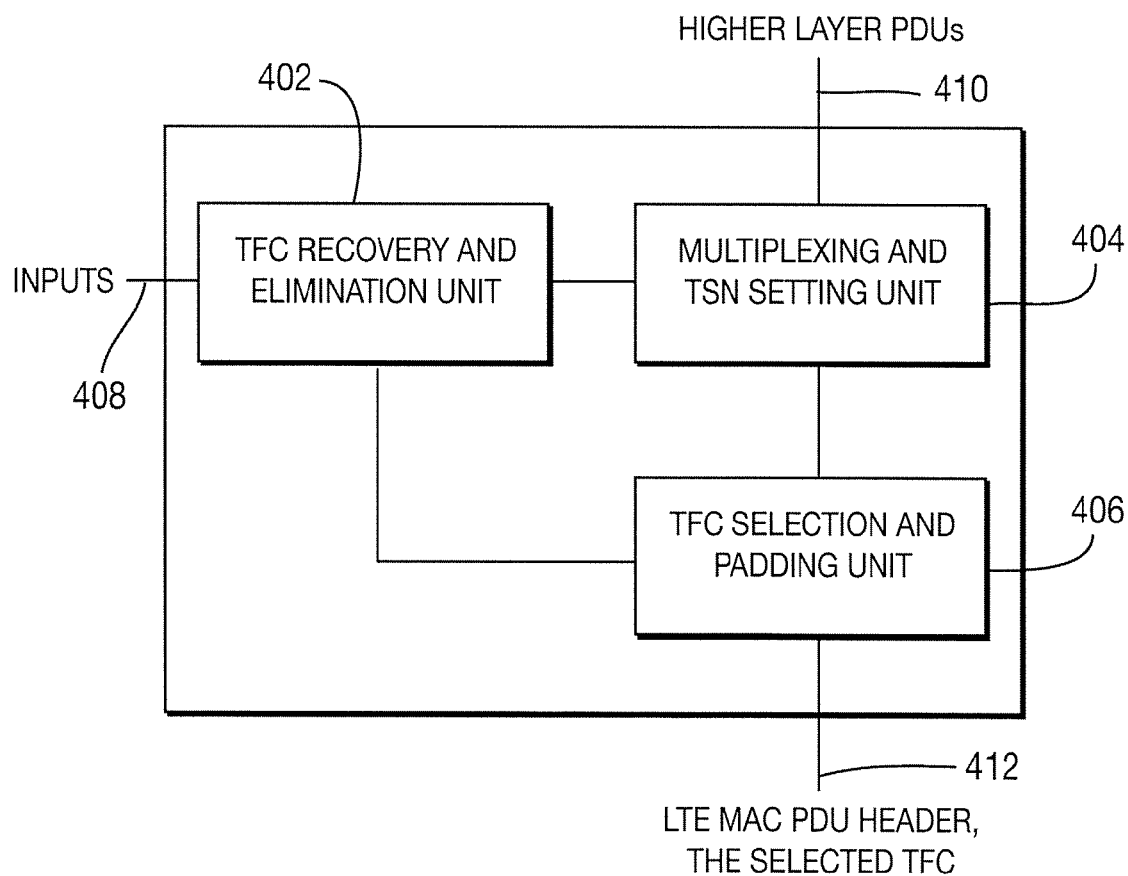
FIG. 4 is a block diagram of a TFC selection unit in accordance with the present invention.

FIG. 4 is a block diagram of a TFC selection unit 400 in accordance with the present invention. The TFC selection unit 400 may be included in a MAC layer of a WTRU 302 or any network entity, such as a Node-B 304. The TFC selection unit 400 includes a TFC recovery and elimination unit 402, a multiplexing and TSN setting unit 404 and a TFC selection and padding unit 406. The TFC recovery and elimination unit 402 computes an allowed TFCS subset by eliminating not supported TFCs and recovering supported TFCs based on inputs 408. The multiplexing and TSN setting unit 404 is responsible for concatenating multiple higher layer PDUs 410 into an LTE MAC PDU, (i.e., the LTE MAC PDU is the multiplexed higher layer PDUs), and optionally managing and setting a TSN per logical channel or MAC flow for each LTE MAC PDU. The TFC selection and padding unit 406 selects an appropriate TFC which can support the maximum LTE MAC PDU size and performs padding, if necessary, so that the LTE MAC PDU fits into the selected TFC. The output 412 of the TFC selection and padding unit 406 is a complete LTE MAC PDU header and the selected TFC.

The present invention considers three scenarios with respect to the TFC selection as follows:

1) Scenario 1: initial transmission of a new data block;

2) Scenario 2: retransmission of a previous failed data block without allocating new radio resources and parameters, (i.e., the data block is retransmitted using the same radio resources and parameters allocated for the initial transmission); and 3) Scenario 3: retransmission of a previous failed data block with new radio resources and parameters, (i.e., the data block is retransmitted using new resources and parameters).

For scenario 1, (i.e., initial transmission), the TFC recovery and elimination unit 402 determines a state, (either supported or blocked), of each of the TFCs to compute an allowed TFCS subset. The inputs to the TFC recovery and elimination unit 402 for TFC recovery and elimination may include at least one of, but not limited to:

a) buffer occupancy of each logical channel;
b) a priority of each logical channel and MAC flow (alternatively, just an indication of the highest priority MAC flow with data to transmit);
c) a remaining transmission power calculated from the maximum allowed power and power requirements for other applications;
d) a TFCS configured by radio resource control (RRC), the TFCS including all possible MCS and relevant subset of subcarrier blocks;
e) a hybrid automatic repeat request (H-ARQ) identity (ID);
f) the maximum number of H-ARQ retransmissions;
g) a fragmentation ID;
h) a recommended MCS;
i) allocated subcarrier blocks (LTE only); and
j) the allocated number of TTIs.

The buffer occupancy is used to determine the amount of data available to be transmitted and the LTE MAC PDU size. The priority of each logical channel and MAC flow, (or the indication of the highest priority MAC flow with data to transmit), is used to determine how the logical channel data will be multiplexed into a MAC PDU. The remaining transmission power is used to determine the LTE MAC PDU size, MCS, or the like.

A TFCS is a set of TFCs that are allowed to choose from for an upcoming transmission. The TFCS may be specified by the standards and/or configured by RRC signaling. The TFCS may be dynamically adjusted by fast MAC or physical layer signaling from a Node-B.

The H-ARQ ID is used to determine the H-ARQ entity that will process the LTE MAC PDU. The maximum number of H-ARQ retransmissions informs the H-ARQ process the maximum number of H-ARQ transmissions for this LTE MAC PDU. The number of transmissions determines the residual block error rate (BLER) which is directly related to each logical channels quality of service (QoS) requirement. This affects the TFC selection unit 400 to decide if fragmentation should be used and MCS should be changed.

The fragmentation ID determines if further fragmentation will be performed and/or MCS should be changed. The recommended MCS affects the determination of an appropriate MCS for transmission. The allocated subcarrier blocks and the allocated number of TTIs are used to determine a proper LTE MAC PDU size.

The remaining power is computed by subtracting power requirements for other applications from the maximum allowed power. The maximum allowed power is set to the minimum of a scheduled maximum allowed power (preferably scheduled by the Node-B 304) and the WTRU maximum transmitter power. The scheduled maximum allowed power may be controlled by the network through layer 2 (L2) or layer 3 (L3) signaling. The remaining power is used as a power ceiling if the Node-B 304 does not provide a recommended MCS. If the Node-B 304 provides the WTRU 302 with the recommended MCS, the corresponding transmit power for the recommended MCS is calculated and compared with the remaining power, whichever smaller is used as a power ceiling for TFC recovery and elimination.

The TFC recovery and elimination unit 402 calculates the power requirement for each of the TFCs in the TFCS. The power requirement for each TFC is calculated based on the number of bits in each TFC, the allocated subset of subcarrier blocks (LTE only), an MCS used in each TFC, and an overhead for fragmentation if fragmentation is needed for transmission.

The TFC recovery and elimination unit 402 eliminates any TFC whose power requirement exceeds the power ceiling, whose required number of subcarrier blocks exceeds the allocated number of subcarrier blocks (LTE only), and whose MCS exceeds the recommended MCS by setting the state of such TFC as blocked, and recovers the remaining TFCs by setting the state of such TFCs as supported. The TFC recovery and elimination process may be further affected by fast MAC or physical layer signaling from the Node-B that either restricts or expands the allowed set of TFCs on a TTI or semi-TTI basis.

The multiplexing and TSN setting unit 404 determines the maximum supported LTE MAC PDU size based on the power ceiling, (i.e., the recommended MCS and the remaining power), allocated radio resources, (such as scheduled subcarriers, number of TTIs), available data for transmission, the largest available supported TFC, or the like and performs either concatenation or segmentation of the higher layer MAC PDU 410. If the data block size from an RLC buffer does not exceed the maximum supported LTE MAC PDU, the multiplexing and TSN setting unit 404 may multiplex multiple higher layer MAC PDUs into an LTE MAC PDU.

If the data block size from the RLC buffer exceeds the maximum supported LTE MAC PDU, the data block is segmented into multiple pieces to make each piece fit the maximum supported LTE MAC PDU size. The LTE MAC PDU may also be a combination of concatenated and segmented higher layer PDUs. The multiplexing and TSN setting unit 404 optionally manages and sets the TSN per logical channel or MAC flow for each LTE MAC PDU and/or each data block within the LTE MAC PDU.

The TFC selection and padding unit 406 then selects preferably the highest TFC calculated from the multiplexed LTE MAC PDU size and the TFCs in the allowed TFCS subset. If the recommended MCS is provided, the MCS in the selected TFC should not be greater than the recommended MCS. The TFC selection and padding unit 406 then performs padding, if necessary, so that the LTE MAC PDU fits into the selected TFC.

For scenario 2, (i.e., retransmission without new radio resources and parameters), the TFC recovery and elimination unit 402 is not needed to calculate a new allowed TFCS subset again and the allowed TFCS subset used for the initial transmission is used for the retransmission. For retransmission, the initial LTE MAC PDU may or may not be fragmented.

If fragmentation is not used for retransmission, the TFC selection and padding unit 406 may select a TFC with an MCS lower than what was used for the initial transmission that can still support the same LTE MAC PDU size as was used for the initial transmission. In the case of LTE, the number of subcarriers required for the new MCS may be different from what was used in the initial transmission and only a subset of the total allocated subcarriers may be used. Padding is necessary to make the PDU the same size as the initial transmission when fragmentation is not used.

If fragmentation is used, the multiplexing and TSN setting unit 404 considers the necessary overhead for fragmentation for determining the fragmented LTE MAC PDU size to make sure that the power ceiling may support this PDU size. For each retransmission, the LTE MAC PDU may be fragmented to several fragmented PDUs by the TFC selection and padding unit 406. The number of fragmented PDUs is determined based on the channel condition measurement. Preferably, the same TFC is used for the first retransmission as the initial transmission and more robust MCS may be used for the subsequent retransmissions.

For the subsequent retransmissions, based on an H-ARQ feedback, (i.e., either a positive acknowledgement (ACK) or a negative acknowledgement (NACK)), of each fragmented PDU, only the fragmented PDUs responded with a NACK are retransmitted. To increase the probability of successful transmission, a TFC with a lower MCS, (compared with the highest allowed MCS), or corresponding subcarrier blocks within the allowed TFCS subset (for LTE) may be selected for the fragmented PDUs in the retransmission. The fragmented PDUs do not have to be the same size as the initial transmission. If the recommended MCS is given, the MCS in the selected TFC should not be greater than the recommended MCS.

For scenario 3, (i.e., retransmission with new radio resources and parameters), new radio resources and parameters, (e.g., the maximum allowed transmission power, the number of subcarrier blocks (for LTE) and a recommended MCS), are re-allocated for retransmissions. The TFC recovery and elimination unit 402 repeats the allowed TFCS subset calculation procedure in scenario 1 for calculating a new allowed TFCS subset based on the new inputs.

If fragmentation is not used, the size of the retransmitted LTE MAC PDU should be same to that of the initial transmission for soft combining, (i.e., incremental redundancy or Chase combing), at the receiver side. If fragmentation is not used, the multiplexing and TFC selection are applied as in scenario 1.

If fragmentation is used for the retransmission, for each retransmission, the LTE MAC PDU may be fragmented to several fragmented PDUs. The number of fragmented PDUs is determined based on channel condition measurement. Optionally, more robust TFC may be used for the subsequent retransmissions. Alternatively, a TFC with a lower MCS may be used for the first retransmission.

For the subsequent retransmissions, based on the ACK/NACK feedback of each fragmented PDU, only the NACKed fragmented PDUs are retransmitted. To increase the probability of successful transmission, a lower MCS, (compared with the highest allowed MCS), and (for LTE) corresponding subcarrier blocks within the allowed TFCS subset may be selected for the fragmented PDUs in the retransmissions. The fragmented PDUs do not have to be the same size as the initial transmission. If the recommended MCS is given, the MCS in the selected TFC should not be greater than the recommended MCS.

Figure 5:
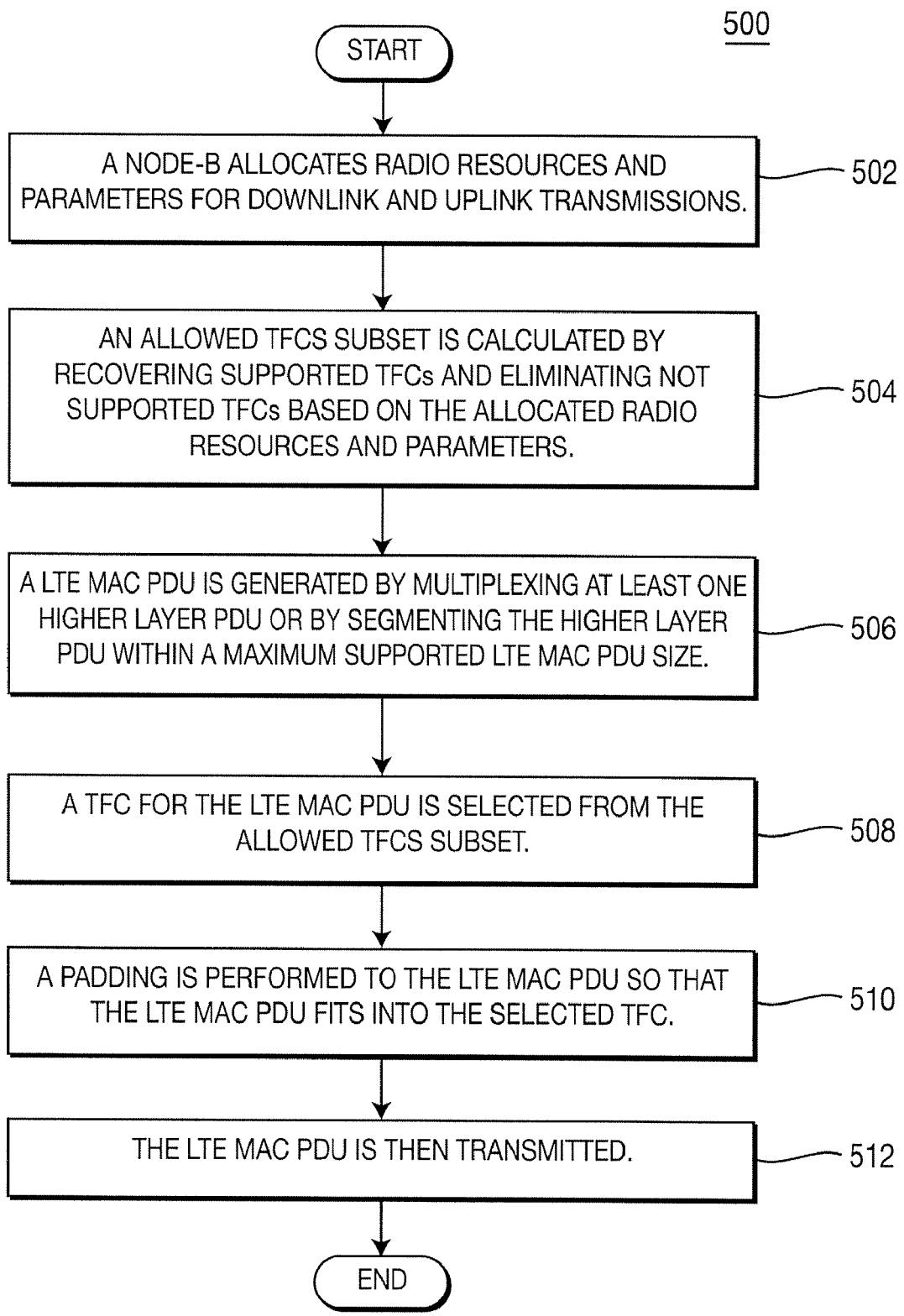
FIG. 5 is a flow diagram of a process for selecting a TFC in accordance with the present invention.

FIG. 5 is a flow diagram of a process 500 for selecting a TFC in accordance with the present invention. A Node-B allocates radio resources and parameters for downlink and uplink transmissions (step 502). An allowed TFCS subset is calculated by recovering supported TFCs and eliminating not supported TFCs based on the allocated radio resources and parameters (step 504). An LTE MAC PDU is generated by multiplexing at least one higher layer PDU or by segmenting the higher layer PDUs within a maximum supported LTE MAC PDU size (step 506). A TFC for the LTE MAC PDU is selected from the allowed TFCS subset (step 508). Padding is performed to the LTE MAC PDU, if necessary, so that the LTE MAC PDU fits into the selected TFC (step 510). The LTE MAC PDU is then transmitted (step 512).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of selecting a transport format combination (TFC) for wireless transmission of data, the method comprising:

determining a recommended modulation and coding scheme (MCS) and a power ceiling for TFC recovery and elimination;

generating a transport format combination set (TFCS);

calculating a power requirement for each TFC in the TFCS based on the number of bits in each TFC and the MCS used in each TFC;

generating an allowed TFCS subset by eliminating any TFC whose power requirement exceeds the power ceiling, and whose MCS exceeds the recommended MCS;

generating a medium access control (MAC) protocol data unit (PDU) by multiplexing at least one higher layer PDU within a maximum supported MAC PDU size;

selecting a TFC for the MAC PDU from the allowed TFCS subset;

performing a padding to the MAC PDU so that the MAC PDU fits into the selected TFC;

allocating radio resources and parameters for an initial transmission of the MAC PDU; and retransmitting the MAC PDU when the initial transmission of the MAC PDU fails, the retransmission being performed by using the same radio resources and parameters used for the initial transmission of the MAC PDU.

2. The method of claim 1 wherein the allowed TFCS subset is generated by eliminating any TFC whose required number of subcarrier blocks exceeds an allocated number of subcarrier blocks.

3. The method of claim 1 further comprising:
performing at least one of expanding the allowed TFCS subset and reducing the allowed TFCS subset based on data received from a base station.

4. The method of claim 1 wherein the same TFC used for the initial transmission is used for retransmission of the MAC PDU.

5. The method of claim 1 wherein a new TFC is selected for the retransmission of the MAC PDU.

6. The method of claim 1 wherein the MAC PDU is fragmented into multiple fragmented PDUs for retransmission, whereby each fragmented PDU is retransmitted separately.

7. The method of claim 6 wherein an overhead for fragmentation is considered for the maximum supported MAC PDU size.

8. The method of claim 6 wherein the same TFC used for the initial transmission of the MAC PDU is used for first retransmission of the fragmented PDUs.

9. The method of claim 6 wherein a TFC with a lower MCS compared to the one used for initial transmission of the MAC PDU is used for first retransmission of the fragmented PDUs.

10. The method of claim 6 wherein only fragments acknowledged with a negative acknowledgement (NACK) are subsequently retransmitted.

11. The method of claim 10 wherein a TFC with a lower MCS compared to a highest allowable MCS is used for the fragments acknowledged with a NACK.

12. The method of claim 1 further comprising:
allocating new radio resources and parameters when the retransmission of the MAC PDU fails; and
selecting a new TFC for a second retransmission of the MAC PDU.

13. The method of claim 12 wherein the MAC PDU is fragmented into multiple fragmented PDUs, whereby each fragmented PDU is retransmitted separately.

14. The method of claim 13 wherein an overhead for fragmentation is considered for the maximum supported MAC PDU size.

15. The method of claim 14 wherein the same TFC used for initial transmission of the MAC PDU is used for the second retransmission of the fragmented PDUs.

16. The method of claim 14 wherein a TFC with a lower MCS compared to the one used for initial transmission of the MAC PDU is used for the second retransmission of the fragmented PDUs.

17. The method of claim 13 wherein only fragmented PDUs acknowledged with a negative acknowledgement (NACK) are subsequently retransmitted.

18. The method of claim 17 wherein a TFC with a lower MCS compared to a highest allowable MCS is used for the fragmented PDUs acknowledged with a NACK.

19. An apparatus for selecting a transport format combination (TFC) for wireless transmission of data, the apparatus comprising:

a TFC recovery and elimination unit configured to calculate a power requirement for each TFC in a transport format combination set (TFCS) based on the number of bits in each TFC and a modulation and coding scheme (MCS) used in each TFC, and generate an allowed TFCS subset by eliminating any TFC whose power requirement exceeds a power ceiling, and whose MCS exceeds a recommended MCS;

a multiplexing and transmission sequence number (TSN) setting unit configured to generate a medium access control (MAC) protocol data unit (PDU) by multiplexing at least one higher layer PDU within a maximum supported MAC PDU size; and a TFC selection and padding unit configured to select a TFC for the MAC PDU from the allowed TFCS subset and perform a padding to the MAC PDU so that the MAC PDU fits into the selected TFC, wherein radio resources and parameters are allocated for an initial transmission of the MAC PDU, the MAC PDU is retransmitted when the initial transmission of the MAC PDU fails, the retransmission being performed by using the same radio resources and parameters used for the initial transmission of the MAC PDU.

20. The apparatus of claim 19 wherein the allowed TFCS subset is generated by eliminating any TFC whose required number of subcarrier blocks exceeds an allocated number of subcarrier blocks.

21. The apparatus of claim 19 wherein the TFC recovery and elimination unit is further configured to perform at least one of expand the allowed TFCS subset and reduce the allowed TFCS subset based on data received from a base station.

22. The apparatus of claim 19 wherein the same TFC used for the initial transmission is used for retransmission of the MAC PDU.

23. The apparatus of claim 19 wherein a new TFC is selected for the retransmission of the MAC PDU.

24. The apparatus of claim 19 wherein the MAC PDU is fragmented into multiple fragmented PDUs for retransmission, whereby each fragmented PDU is retransmitted separately.

25. The apparatus of claim 24 wherein the multiplexing and TSN setting unit considers an overhead for fragmentation for the maximum supported MAC PDU size.

26. The apparatus of claim 24 wherein the same TFC used for the initial transmission of the MAC PDU is used for first retransmission of the fragmented PDUs.

27. The apparatus of claim 24 wherein a TFC with a lower MCS compared to the one used for initial transmission of the MAC PDU is used for first retransmission of the fragmented PDUs.

28. The apparatus of claim 24 wherein only fragments acknowledged with a negative acknowledgement (NACK) are subsequently retransmitted.

29. The apparatus of claim 28 wherein a TFC with a lower MCS compared to a highest allowable MCS is used for the fragments acknowledged with a NACK.

30. The apparatus of claim 19 wherein the TFC recovery and elimination unit generates a new allowed TFCS subset based on new radio resources and parameters when the retransmission of the MAC PDU fails, whereby the MAC PDU is retransmitted by using the new allowed TFCS subset.

31. The apparatus of claim 30 wherein the MAC PDU is fragmented into multiple fragmented PDUs, whereby each fragmented PDU is retransmitted separately.

32. The apparatus of claim 31 wherein the multiplexing and TSN setting unit considers an overhead for fragmentation for the maximum supported MAC PDU size.

33. The apparatus of claim 32 wherein the same TFC used for initial transmission of the MAC PDU is used for a second retransmission of the fragmented PDUs.

34. The apparatus of claim 32 wherein a TFC with a lower MCS compared to the one used for initial transmission of the MAC PDU is used for a second retransmission of the fragmented PDUs.

35. The apparatus of claim 31 wherein only fragmented PDUs acknowledged with a negative acknowledgement (NACK) are subsequently retransmitted.

36. The apparatus of claim 35 wherein a TFC with a lower MCS compared to a highest allowable MCS is used for the fragmented PDUs acknowledged with a NACK.

* * * * *